United States Patent
Fernandes et al.

(10) Patent No.: US 9,142,111 B2
(45) Date of Patent: Sep. 22, 2015

(54) FLARE NETWORK MONITORNG SYSTEM AND METHOD

(71) Applicant: Saudi Arabian Oil Company, Dhahran (SA)

(72) Inventors: Antonio Francisco Conrado Fernandes, Dhahran (SA); Rama Kameshwara Prasad Pantula, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 24 days.

(21) Appl. No.: 14/193,188

(22) Filed: Feb. 28, 2014

(65) Prior Publication Data

US 2014/0266740 A1     Sep. 18, 2014

Related U.S. Application Data

(60) Provisional application No. 61/790,602, filed on Mar. 15, 2013.

(51) Int. Cl.
*G08B 17/00* (2006.01)
*G05B 23/02* (2006.01)

(52) U.S. Cl.
CPC .......... *G08B 17/00* (2013.01); *G05B 23/0224* (2013.01)

(58) Field of Classification Search
CPC .... G08B 17/00; G08B 17/02; G05B 23/0224; F23G 5/50
USPC ................. 340/577, 578, 584, 588, 628, 632; 250/339, 340, 554; 382/100, 162, 164, 382/191; 431/12, 13, 14, 18
See application file for complete search history.

(56) References Cited

U.S. PATENT DOCUMENTS

| | | | |
|---|---|---|---|
| 4,233,596 A | 11/1980 | Okamoto |
| 4,516,932 A | 5/1985 | Chaudot |
| 4,529,703 A | 7/1985 | Girling |
| 4,856,321 A | 8/1989 | Smalling |
| 5,625,342 A | 4/1997 | Hall |
| 5,813,849 A | 9/1998 | Schwartz |

(Continued)

FOREIGN PATENT DOCUMENTS

WO      2008116037 A1     9/2008

OTHER PUBLICATIONS

"Landfill Methane Reclamation and Flare Stack Monitoring," http://www.bannerengineering.com, retrieved May 20, 2013, 2 pages.

(Continued)

*Primary Examiner* — Hung T Nguyen
(74) *Attorney, Agent, or Firm* — Abelman, Frayne & Schwab

(57) ABSTRACT

A flare monitoring system that receives real-time data associated with the release of a processing facility's combustible fluids to a flare stack and analyzes the data in conjunction with parameters of the processing facility's flare-through elements such as manual valves, control valves, restriction orifices, flow meters, and the like. The results of the analysis are provided to operators in the form of reports that indicate: whether flaring events are of a routine or non-routine nature; the flared volume; the contribution of the flare-through elements to the flared volume; and so forth. The results can aid operators in reducing combustible fluid losses due to flaring and in mitigating emissions of sulfur, nitrogen and carbon dioxide.

14 Claims, 6 Drawing Sheets

(56) References Cited

U.S. PATENT DOCUMENTS

| | | | |
|---|---|---|---|
| 6,046,452 A * | 4/2000 | Castleman et al. | 250/339.15 |
| 7,119,697 B2 | 10/2006 | King | |
| 8,138,927 B2 | 3/2012 | Diepenbroek | |
| 2006/0161388 A1 | 7/2006 | Weinberg | |
| 2006/0238741 A1* | 10/2006 | Ninomiya et al. | 356/5.01 |
| 2008/0233523 A1* | 9/2008 | Diepenbroek et al. | 431/14 |
| 2009/0046172 A1 | 2/2009 | Rao | |
| 2009/0309028 A1 | 12/2009 | Venkoparao | |
| 2011/0207064 A1 | 8/2011 | Salani | |
| 2012/0150451 A1 | 6/2012 | Skinner | |
| 2012/0210257 A1* | 8/2012 | Mosley et al. | 715/764 |

OTHER PUBLICATIONS

"Reducing Emissions with Flare Stack Monitoring," http://www.oleumtech.com, retrieved May 20, 2013, 2 pages.

"iNodes Wireless Pressure Monitor," http://www.fbdover.com, copyright 2012, 2 pages.

International Search Report & Written Opinion in related application PCT/US2014/019309, mailed Jun. 18, 2014, 9 pages.

* cited by examiner

FLARE NETWORK MONITORNG SYSTEM AND METHOD

RELATED APPLICATIONS

The present application claims the benefit of U.S. Provisional Patent Application No. 61/790,602 filed on 15 Mar. 2013, the disclosure of which is incorporated herein by reference in its entirety.

BACKGROUND OF THE INVENTION

1. Field of the Invention

The present invention relates to flare network monitoring systems and methods.

2. Description of Related Art

Flaring is a process by which excess fluids (gases and in some circumstances liquids) are released and combusted at a flare stack. These excess fluids are derived from multiple sources within commercial and industrial processing facilities, e.g., petroleum refineries.

Flare sources can be based on process control design in which flaring events are routine and anticipated and occur for equipment and personal safety. Flare sources can also result from unplanned events such as operational upsets, plant emergencies, equipment failures, plant start-ups, plant shutdowns, turn-around and inspect activities, human error and the like.

There is considerable motivation to reduce losses in petroleum refinery operations; particularly losses associated with flaring.

Conventional flare systems are limited by their ability to obtain flare measurements that are adequate in the number of sources, of suitable quality and of useful frequency. This typically leads to inadequate monitoring of flare sources that relies on manual and inaccurate flare estimation methods, e.g., John Zink's Flare Estimation Charts based on flame length.

Therefore, there is a significant need to improve flare monitoring systems in commercial and industrial processing facilities. Current flare monitoring systems typically monitor flare conditions via a flowmeter located at the flare. This configuration makes it difficult to determine the source of non-routine flare events, which often have significant impact on plant operations.

Accordingly, it is an object of the present invention to improve flare monitoring systems so as to provide more accurate and useful data as well as minimize the impact of non-routine flare events.

BRIEF DESCRIPTION OF THE DRAWINGS

The present invention will be further described below and in conjunction with the accompanying drawings in which.

Figure 1:
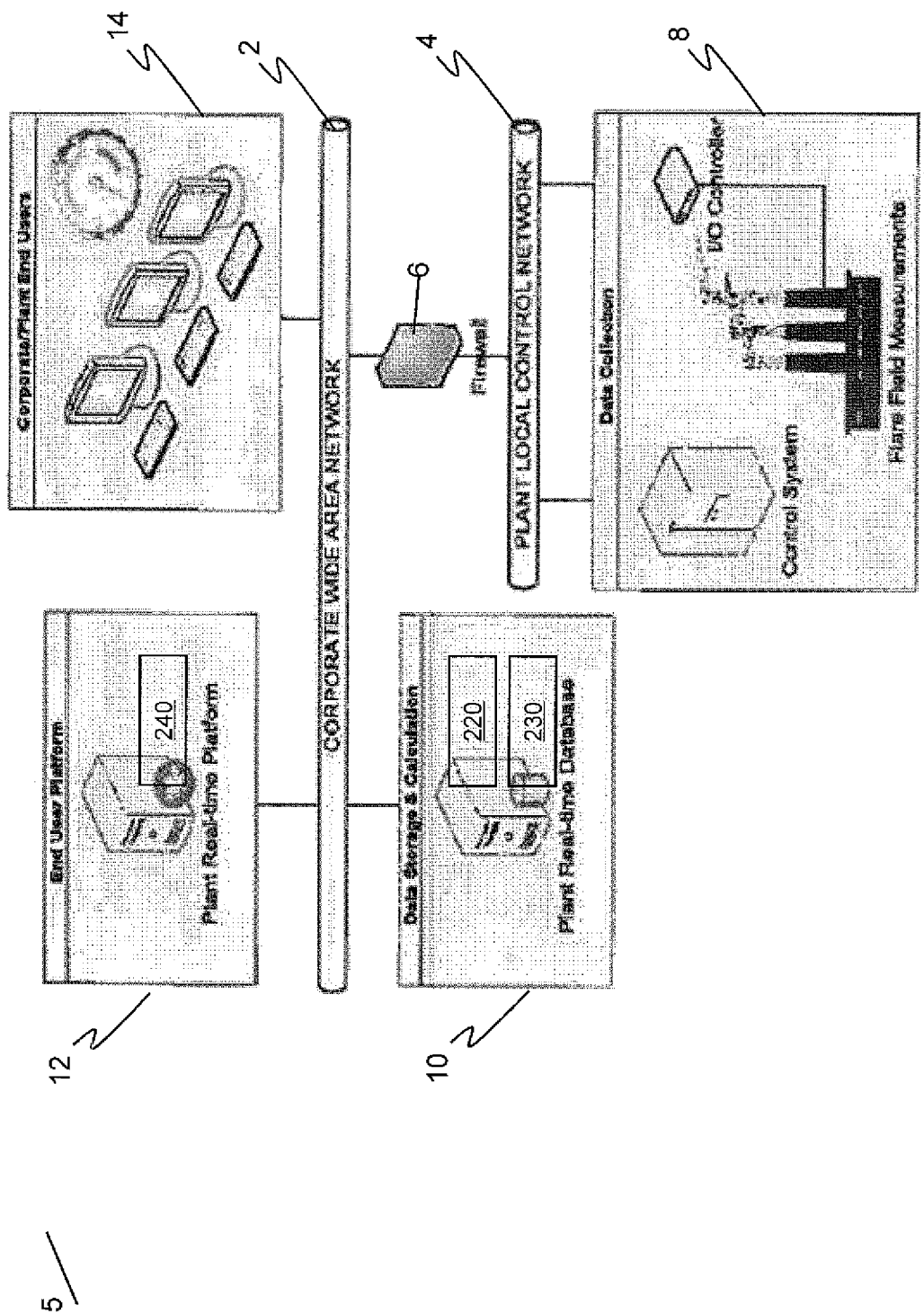
FIG. 1 is a schematic of an embodiment of a flare monitoring system architecture.

To facilitate an understanding of the invention, the same reference numerals have been used, when appropriate, to designate the same or similar elements that are common to the figures. Unless stated otherwise, the features shown and described in the figures are not drawn to scale, but are shown for illustrative purposes only.

DETAILED DESCRIPTION OF THE INVENTION

As used herein, "commercial or industrial processing facility" includes one or more chemical plants, hydrocarbon refineries and related operations, petrochemical facilities, manufacturing factories, or any facility from which flare fluids are generated and typically removed via combustion in one or more flare stacks.

A flare monitoring system is provided that generates accurate, real-time presentation and detailed reporting of flare events. The generated real-time presentations and data reports have been lacking in the industry, particularly on an enterprise level, hampering the success of enterprise flare minimization initiatives.

The invention is directed to an improved flare monitoring system that generates accurate, real-time presentation and detailed reporting of flare events. The flare monitoring system allows for monitoring of flare systems at plural plants within a processing facility as well as at plural processing facilities and utilizes measurements of control valves including pressures, temperatures, and other process variables to flared quantities. By monitoring these measurements, operators will be able to more effectively optimize the operation of their plants, resulting in a minimization of hydrocarbon loss through the flare as well as mitigation of environmental impact. Further, by monitoring conditions at the control valves or other flare-through elements, detection and isolation of the source of non-routine flare events will be simplified, resulting in minimum impact on plant operations.

In the past, implementing an enterprise-wide flaring minimization plan was greatly hampered due to inadequate and/or faulty measurements of the flared quantities. Known flare gas flow metering is difficult in its application and can be prone to failure. Further in vast flare networks connected to many flare sources it was conventionally difficult to track and record data in real time from the actual flaring source to assign the causes of flaring.

The flare monitoring system can serve to assist in the reduction of hydrocarbon losses through accountability by providing management the means to set realistic targets; to mitigate the environmental impact by reduction of $SO_x$, $NO_x$ and $CO_2$ emissions; to provide the foundation for enterprise flare minimization initiatives; and provide data useful for hydrocarbon loss accounting programs.

FIG. 1 is a schematic of an embodiment of a flare monitoring system architecture 10, including data collection, data storage, computation, presentation and reporting functions. As depicted architecture 5 generally includes communication between a plant local control network 4 and an enterprise wide area network 2, typically through a firewall 6. Plant local control network 4 includes a data collection system 8 which provides flare field measurements as described herein. The enterprise wide area network generally includes a data storage and calculation server 10, an end user platform server 12, and presentation devices 14. Flare event data is generated and collected in real-time as necessary and as being associated with flare events. For instance flare event data is collected by data collection system 8, then forwarded via plant local control network 4 and enterprise wide area network 2 to the data storage and calculation server 10. Data storage and calculation server 10 then processes the data and communicates it via the enterprise wide area network 2 to the end user platform server 12. End user platform server 12 provides for report generation as specified and presentation via the enterprise wide area network to presentation devices 14.

In the embodiment shown, a data historian module 220 and a computation module 230 are contained within data storage and calculation server 10, and a display module 240 is contained within the end user platform server 12 although the precise location of the modules 220, 230, 240 are not necessary aspects concerning the operation of the present system and process. The data historian module 220 has effective communications with the data signals associated with flare events either directly from the flare-through elements or through data collection system 8, or a combination thereof. In addition, a plurality of data historian modules and computation modules can be provided for larger networks, for instance.

Figure 2:
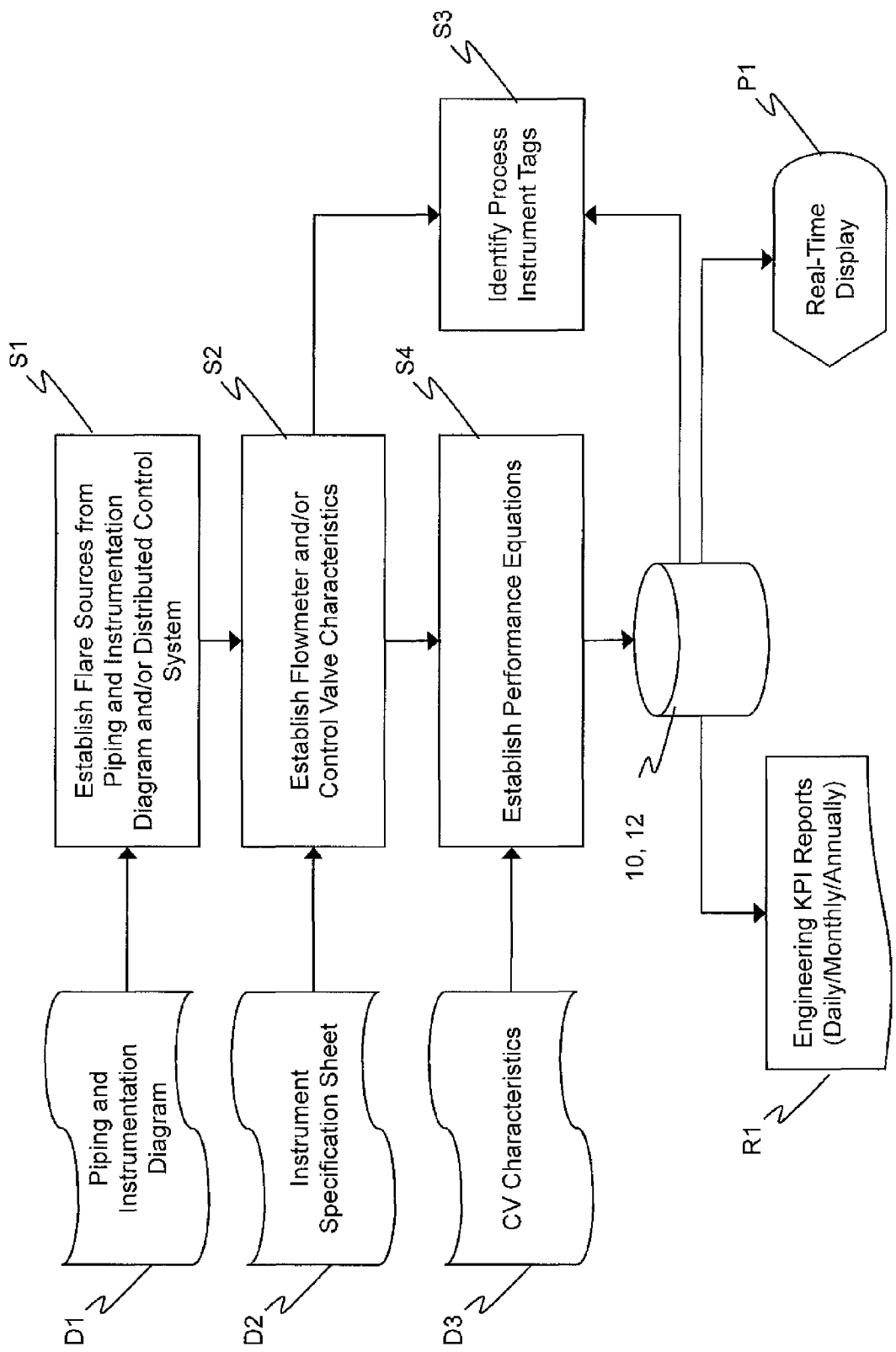
FIG. 2 is a process flow chart for a configuration of a flare monitoring system.

FIG. 2 is a process flow chart for a configuration of a flare monitoring system described herein. The flare monitoring system development generally includes procurement, review and study of plant piping and instrumentation diagrams;

procurement, review and study of control valve instrument specification data sheets;

site visits for inspection and confirmation;

procurement and study of vendor and control valve model type specific data;

development of equations to translate control valve openings to flared quantities in volumetric flow, e.g., standard cubic feet (SCF);

configuring process instrumentation performance equations to archive quantity flared through each flare control valve;

development of flare monitoring system presentation, e.g., visual display, to include all contributing control valves and equipment to the flare headers (low pressure and high pressure) from each plant; and development of interactive reports to facilitate flare minimization initiatives.

At step S1 shown in FIG. 2, flare sources are established from one or more piping and instrumentation diagrams (data D1) and/or a distributed control system. They can be tabulated, for instance, as shown in the exemplary table depicted in FIG. 4 which is also described further herein. The necessary input data is derived from one or more sources including but not limited to plant engineer(s), facility administrators and/or operators, piping and instrumentation diagrams and specifications (design and/or as-built), instrumentation specification sheets (ISS) for each control valve, restriction orifice, flow meter and the like, and data for each manual valve.

At step S2, control valve and/or flow-meter characteristics are established using instrument specification sheets (data D2). This information is associated with identified process instrument (PI) tags (such as process variable, PV, or output, OP) in step S3, and performance equations are established in step S4, using data D3, such as vendor valve flow coefficient (Cv rating). The respective data is stored in data storage and calculation server 10, and processed data is communicated to end user platforms server 12 for reporting R1 and presentation P1.

Figure 3:
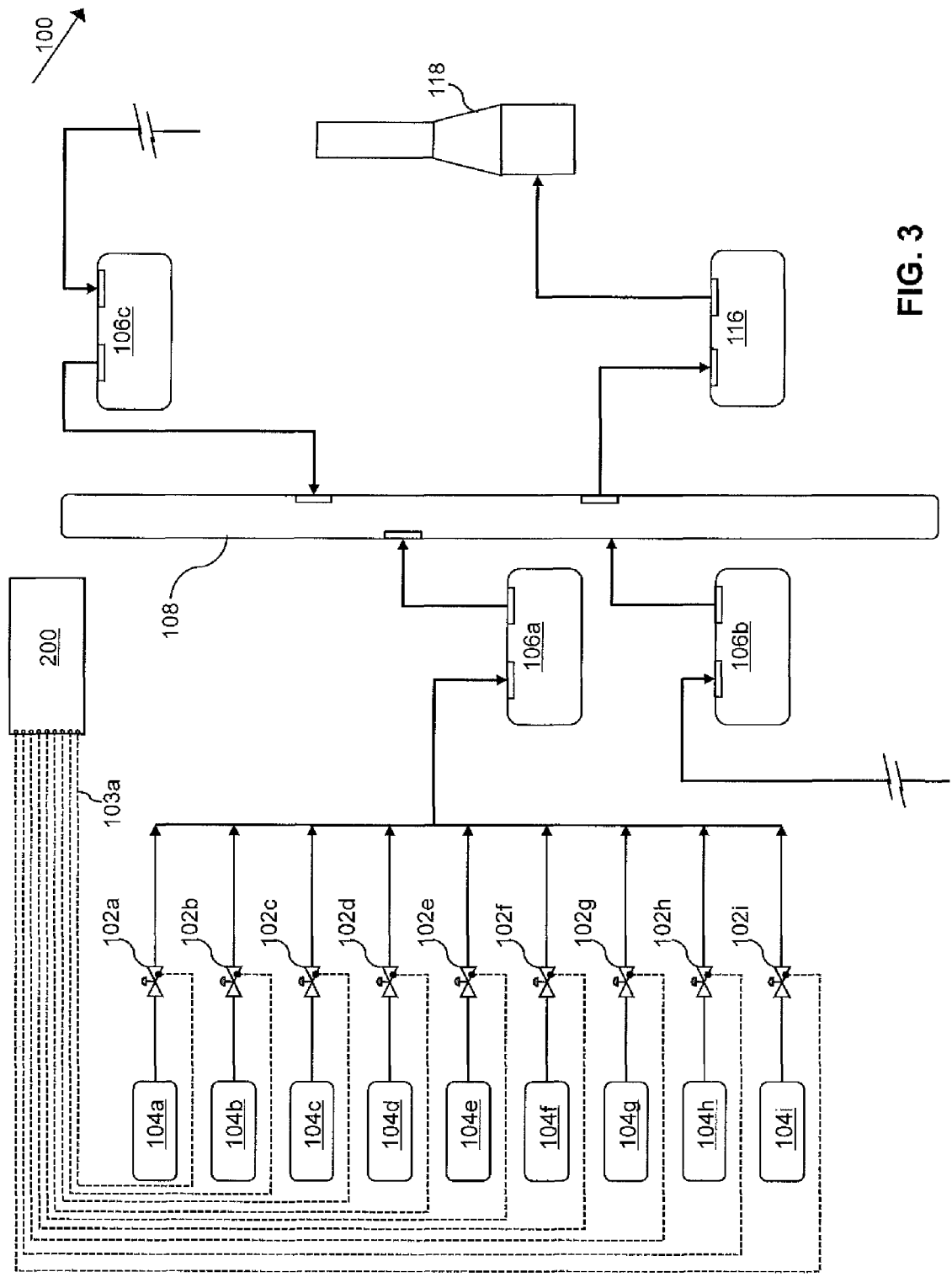
FIG. 3 is a schematic diagram of a multi-unit flare generating system.

FIG. 3 is a schematic diagram of a multi-unit flare generating system 100, e.g., a refinery or other commercial or industrial processing facility. In particular, system 100 includes control valves 102a-102i and corresponding fluid sources 104a-104i, e.g., associated with one or more unit operations or sub-systems in a refinery. Each set of valve 102 and source 104 represents a contributing flare fluid source that can be routine or non-routine. Typically the plurality of fluid sources 104a-104i are in selective fluid communication with a flare fluid knockout drum 106a (e.g., a vapor-liquid separator) via the control valves 102a-102i, and the knockout drum feeds a flare header 108. Flare header 108 also typically receives flare fluid from a plurality of additional knockout drums, e.g., 106b, 106c, which are in selective fluid communication with other unit operations or sub-systems in the same refinery. In certain embodiments, the plant can include one or more flare gas flowmeters, for instance, at the stack 118 and/or one or more of the inlets and outlets to the flare header 108.

Each of the control valves 102a-102i is in communication with a computer system 200. The communication can generally be one-way or two-way, for instance to provide condition data, e.g., in the form of electrical signals, to computer 200 and/or to receive instructions from computer 200. For the purpose of the process and system described herein, the communication is concerned with provision of condition data describing the condition of valves 102.

Flare fluid from header 108 is conveyed to knockout drum 116 and the gaseous portion is typically flared from system 100 as is known to those of ordinary skill in the art.

Figure 4:
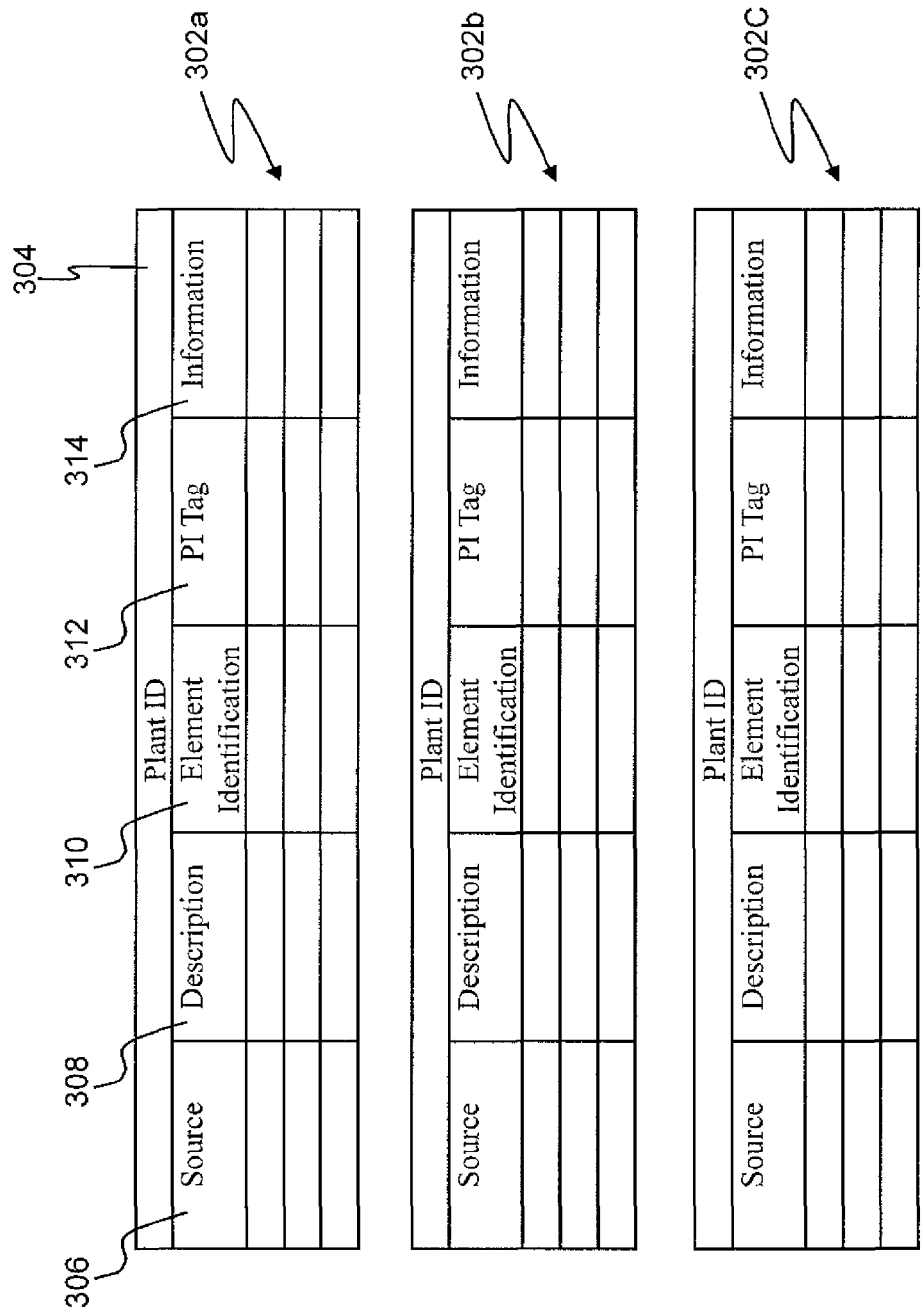
FIG. 4 illustrates tabular compilations of contributors to a flare header.

FIG. 4 illustrates tabular compilations of contributors to a flare header. A plurality of tables 302a-302c is shown, each associated with a certain plant or portion thereof identified in title bar 304, e.g., "Plant Y-XX" in which, for instance, Y represents an alphabetic character and X represents a numeric character. Each table includes a column 306 which identifies the flare contributor source; a column 308 which states a description for the associated source; a column 310 which states the element of concern, e.g., a control valve, flow meter, restriction orifice or other valve, as identified in suitable information concerning the plant such as a piping and instrumentation diagram; column 312 which states the tag code, for instance, as used in a piping and instrumentation diagram and/or instrumentation specification sheets; and column 314 which states general comment(s) about the source, e.g., whether it is high pressure or low pressure, or other information. Data 312 can be distributed control system (DCS) or process instrument (PI) tags associated with information concerning the control valve opening, for instance, as a percentage signal.

As discussed above (e.g., step S4 in FIG. 2), control valve performance equations are established to convert real-time valve opening data into flared volumes. Flared volume calculations and output recorded are based on event occurrence, rather than a predefined intervals, to ensure data is collected and recorded whenever a flaring event (routine or non-routine) occurs.

Figure 5:
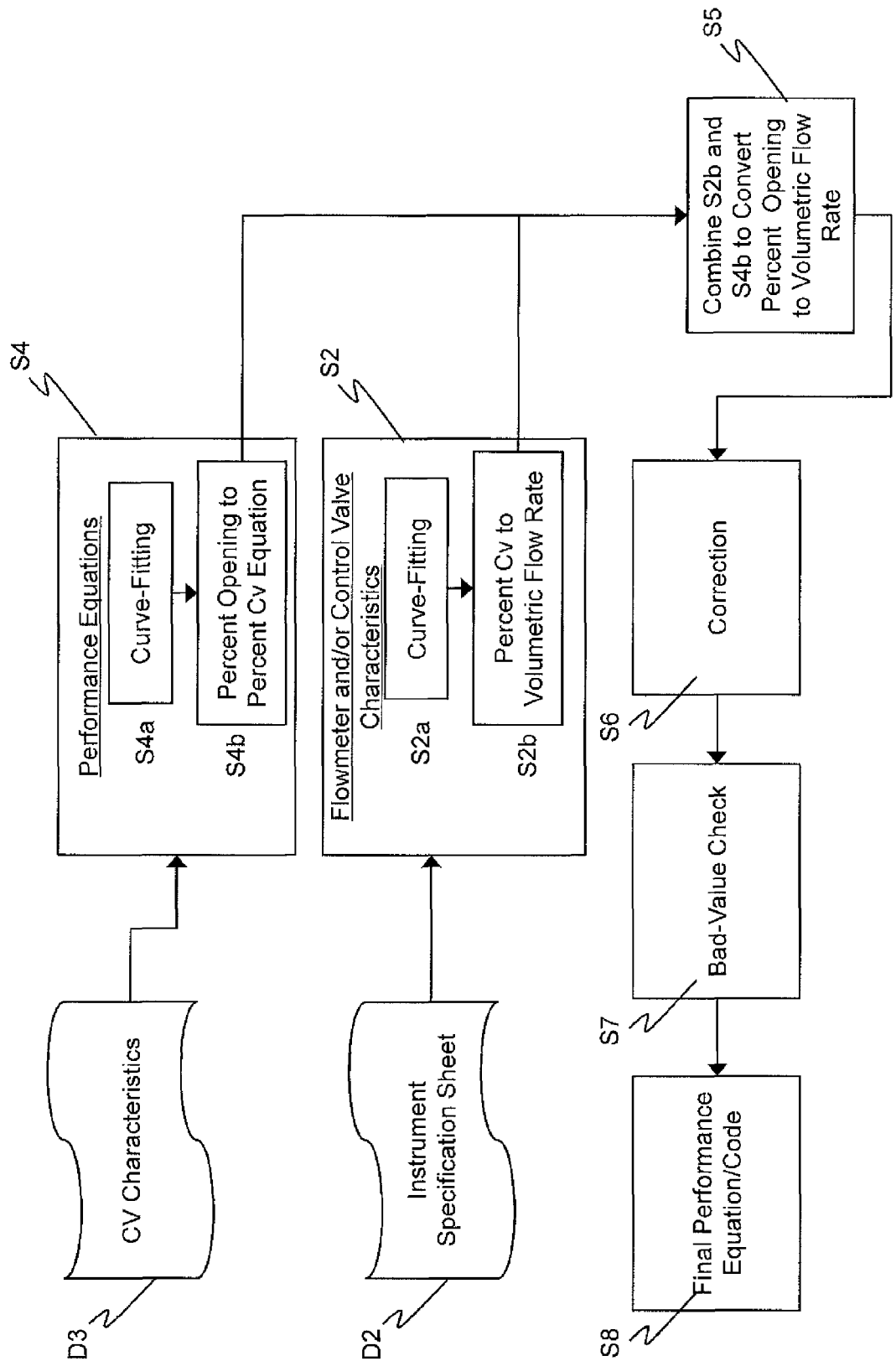
FIG. 5 represents process steps for obtaining flared gas volume data.

FIG. 5 represents process steps for obtaining flared gas volume data for reporting R1 and real-time display P1 (using similar reference numerals and characters as in FIG. 2). At step S4, using Cv characteristics from D3, performance equations are established by an appropriate curve-fitting equation at step S4a and an equation for conversion of percent opening data to percent Cv at step S4b. In certain embodiments of step S4b, vendor data is used to obtain a suitable curve that converts the percent signal generated by a control valve to the percent Cv, for instance, as a linear relationship or a higher order polynomial fit. The type of relationship or polynomial fit is related to the valve characteristics and the error tolerance.

At step S2, using the ISS from D2, flowmeter and/or control valve characteristic equations are established by an appropriate curve-fitting equation at step S2a and an equation for conversion of percent Cv to volumetric flow rate at step S2b. In certain embodiments of step S2b, data from an ISS is used to obtain a suitable curve that converts the percent Cv to volumetric flow rate, for instance, as a linear relationship or a higher order polynomial fit. The type of relationship or polynomial fit is related to the valve characteristics and the error tolerance.

At step S5, a direct equation is established by combining S2b and S4b to convert percent opening to volumetric flow rate. At this stage, the performance equation is established for the process conditions defined at the design stage in the ISS.

At step S6, corrections are applied to account for anomalies between design and observed conditions, including correction to flow (Q) for inlet pressure $P_1$, specific gravity (Gg) and Temperature ($T_1$) using the Equation 17b from "Flow Equations for Sizing Control Valves," ISA-75.01.01-2007:

$$Cv = \frac{Q}{0.667 N_7 F_p P_1} \sqrt{\frac{G g T_1 Z}{F_7 x_{TP}}}$$

where
Cv=Control valve flow coefficient;
$N_7$, $F_p$, $x_{TP}$ are Pipe/Valve specific coefficients; and
$F_p$=Specific heat ratio factor.

In addition, corrections for gravity can be incorporated where large differences exist between design and actual conditions. For instance, corrections can be based on Daniel Bernoulli relationships, in which the square of the fluid velocity is directly proportional to the pressure differential and inversely proportional to the specific gravity of the fluid:

$$Q = Cv \sqrt{\frac{\Delta P}{G}}$$

where
Q=Flow in GPM;
Cv=Control valve flow coefficient;
$\Delta P$=Pressure differential in psi; and
G=specific gravity of fluid.

Inlet pressure $P_1$ correction for the flow Q is included. Since Gg and $T_1$ can have a lesser impact on flow, correction can be applied in cases where the observed plant process data differs more than ±5% from the design conditions.

Step S7 conducts checks for minimum or maximum values, and checks for bad values (including those other than numeric). A bad-value module is employed to filter out noise from the DCS archived in PI tags. If there is a spurious value other than numeric, either in a control valve PI tag or an inlet pressure PI tag, or if the recorded value is below the minimum value of the flare control valve, recorded flared volume will be set to zero. If the recorded volume is greater than the maximum value, recorded flared volume will be set to the maximum value.

At step S8, the final performance equation and associate code including consideration for correction and spurious values are set forth.

The trigger for the recording of data from the flare-through elements is event based, rather than time based. This ensures that the recording in flared volume (FV) tags is carried out whenever a flaring event occurs. In certain embodiments, for instance, in a PI server (such as one manufactured by OSIsoft, LLC), in order to capture any flaring event where the flared volume is higher than 0.05% of the maximum value, the PI tag attribute for the field "span" shall include maximum flaring quantity and the "excdev" field value to be 0.05 for the respective control valve.

Accordingly, a performance equation in the form of code containing exceptions for bad values, and correction for flow, gravity and/or inlet pressure, is established for each flare-through element. A PI tag is established to archive the data signal correlation (e.g., control valve opening), and a PI tag is established to archive the inlet pressure for the particular flare-through element.

In certain embodiments depressuring valves are treated separately. The volume of flare gas is determined and stored in the respective FV Tag. In certain embodiments one value of a fixed amount of gas, e.g., in terms of standard cubic feet, is stored for one instance of depressuring. The opening of the valve is detected using an appropriate PI tag. For instance, if the current value in the FV tag is less than or equal to "Limit" (e.g., 50% of a compressor discharge pressure in case of compressor depressuring valve) a flaring event is triggered [and the FV tag will store the depressuring volume as a constant value.

The flared volume is determined, for instance using suitable process modeling software which can have its output data communicated to one or more modules described herein. In a depressuring valve system, volumes determined before cooling can include the total volume within a suction pipeline, within a compressor discharge pipeline and within a pipeline compressor suction drum, and volumes determined after/during cooling can include those in the heat exchanger tubes and in the pipeline after the cooler to the control valve. Using data in an ISS sheet of a depressuring valve, the Cv of the selected valve and peak depressuring rate are matched. In a typical modeling system, e.g., Aspen HYSYS produced by Aspen Technology Inc., a mass of depressurized gas is determined, which can be converted into standard volume for the present system.

The PI performance equation tag can include attributes such as a tag identifier, a description field, whether the listed attributes concern a flared volume for an event or a summation of flared volumes over a period of time, such as daily, a span field, an excdevpercent field (exception deviation as a percent), an exdesc field which contains event equations dependent on Cv characteristics and ISS data (or FV data or tag for summation data), a typical value field (e.g., 50% of the span), a compdevpercent field (compressor deviation as a percent), a compmin (minimum compression) field, a compmax field (maximum compression), and other attributes useful to prepare the final performance equations including corrections and consideration for spurious values.

The flare monitoring system tags should include tags for each flare-through element (control valve, restriction orifice, flow meter and the like, and data for each manual valve), for each plant in the facility that contributes to the flare, for each pressure header per plant, and for each pressure header in a facility.

The flare monitoring system tags should be suitably identified, e.g., with characters representing a particular plant number within a refinery and to facilitate integration in a larger scale flare management system. For instance, e.g., "D48" is an exemplary plant number that represents a particular type of treating at location "D" and accordingly, the tags should read as "D48XXXXXXXXX" wherein XXXXXXXX is the flaring source equipment name or indicia.

Flared Volume (FV) tags are PI tags that provide the instantaneous flaring rate in SCFH, MSCFH or MMSCFH. The events stored in an FV tag are managed by the events on the flare-through element (e.g., control valve) opening received by PI from the Distributed Control Systems (DCS). The numbers of events are managed by the compression parameters. In certain embodiments, in addition to the real-time event collection, it is useful to store an event at least every 15 minutes.

DFV (Daily Flared Volume) tags are daily (24 hour) flaring totals, e.g., from midnight to midnight, in SCFD, MSCFD or MMSCFD. The DFV tag stores 1 event per day, e.g., at midnight (00:00 Hours).

SFV (Shift Flared Volume) tags can also be provided, e.g., as 8 hourly totals recorded at the end of a shift in SCF, MSCF or MMSCF. The SFV tags can store, e.g., 3 events per day.

A flare monitoring system schematic drawing can be developed using known software, such as Microsoft Inc.'s Visio, or OSIsoft, LLC's ProcessBook, or other suitable real-time data infrastructure and collaboration tool. The entire facility flare system is thus ascertained showing the location of each flare-through element (e.g., control valve, manual valve, restricting orifice, etc.), for all equipment that contribute to both the low pressure, high pressure or acid flare headers from each plant within the facility. If such a schematic is developed in an external graphics application (e.g., Visio), the information can be imported in OSIsoft, LLC's ProcessBook or other suitable al-time data infrastructure and collaboration tool, whereby the Cv Percent Opening can be displayed, e.g., as a horizontal bar graph, and the FV Tag data can be displayed as a numeric value.

Reports can be generated based on the overall network, an individual plant, a selected group of plants within a refinery, or a portion of a plant. The data presented at this level can include, for instance, a chart that presents daily flaring activity for a given refinery in volume, with correlated equivalent in terms of barrels of crude per day, and monetary equivalents. This can be presented as data tables and/or graphs. The data reports can be provided, separately or in conjunction with the above, based on a given source in each plant. The data reports can be provided, separately or in conjunction with the above, based on all of the plants in a given refinery to demonstrate the plant(s) responsible for a majority of flaring events.

The reports of flare data can incorporate certain assumptions including the average heat content of crude oil, the average heat of combustion for pure gases at standard conditions, and the gas monetary value.

Flare sources can be based on process control design in which flaring events are classified as routine or non-routine. Routine flare sources are anticipated and occur for equipment and personal safety, and include, for instance, purging gas to eliminate air from the flare headers, leakage, and normal operation of control valve discharges based on process design considerations. Non-routine flaring events include those resulting from unplanned events such as operational upsets that increase the volume of flare gas produced or decrease the ability of the gas handling system to accommodate it, such as pressure relieve malfunction, equipment overpressure or other cause for relieving relief valves, equipment plugging resulting in local overpressure, loss of a major process unit compressor (e.g., FCC wet gas compressor), loss of fuel gas recovery system compressors, reciprocating compressor seats overheating from high nitrogen or hydrogen content, fuel gas with low specific gravity or high heat of compression resulting in overheating, high inlet temperature to the flare gas compressor, and/or general mechanical problems from the operation of rotating equipment. Non-routine flaring events are also a result of plant emergencies (equipment failures and operational errors that result in equipment overpressure, typically leading to relief valves opening to the flare system, which can be classified as emergencies; emergency flaring events are severe instances of upsets or malfunction and often have the same set of basic causes); mechanical failure (flaring attributed to mechanical equipment or instrumentation failure); startup and shutdown (flaring attributed to startup and shutdown); process/fuel imbalance (flaring resulting from temporary fuel imbalance in the fuel system or inadequate gas processing capacity); and other causes (including instances of flaring not attributable to the above categories such as specific actions by operation staff or any other operational situations to be specified by the facilities).

For each flaring event, classification into one of the above categories or subcategories should be accomplished along with identification of the source, the rate, duration and the reasons of flaring, repetitive flaring from the same plant/equipment along with the corrective actions to be undertaken to avoid recurrence of such events in future need to specified.

Figure 6:
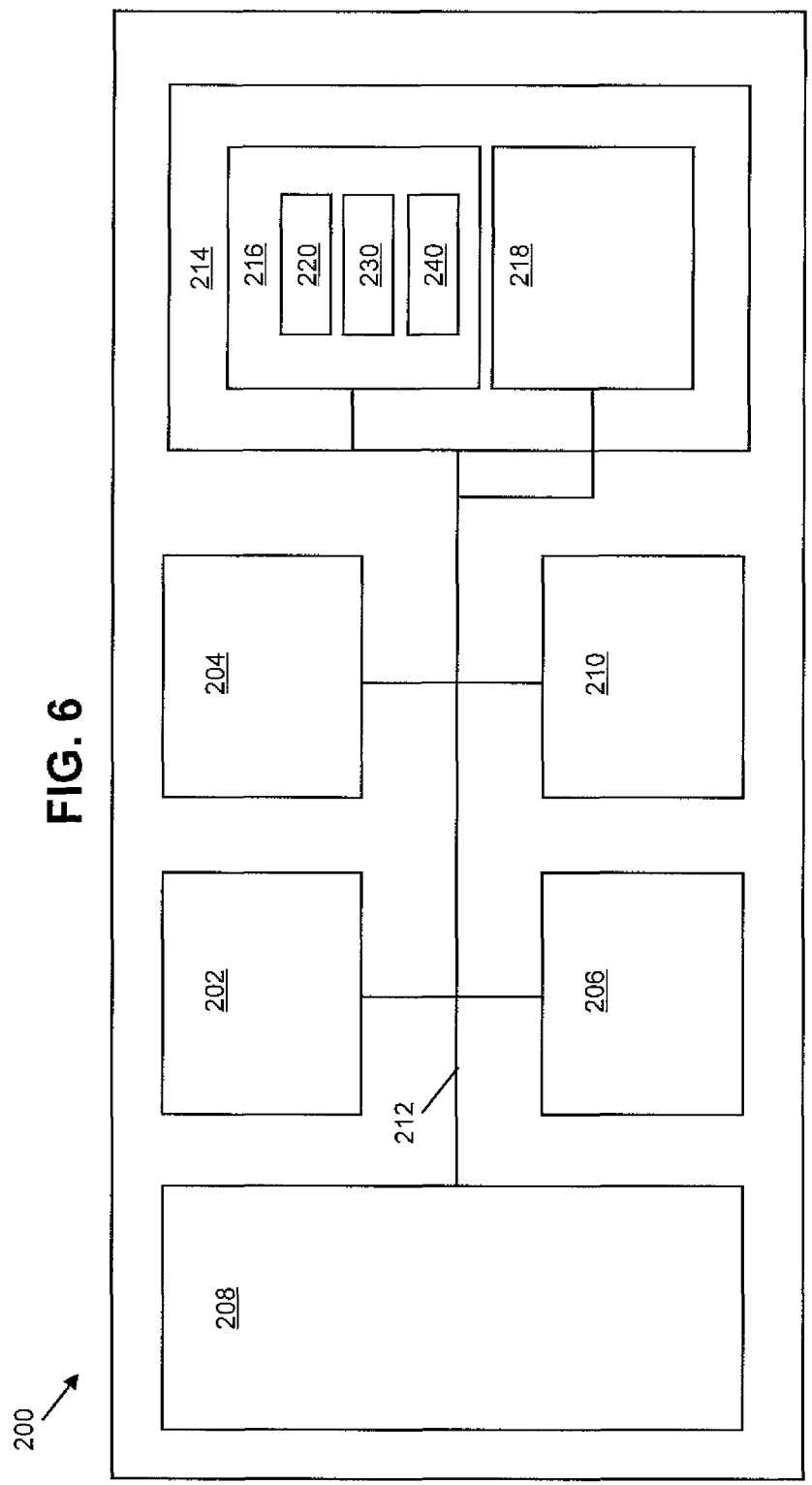
FIG. 6 is an exemplary block diagram of a computer system by which the flare monitoring data modules comprising one embodiment of the invention can be implemented.

An exemplary block diagram of a computer system 200 by which the flare monitoring data modules described herein can be implemented is shown in FIG. 6. Computer system 200 includes a processor 202, such as a central processing unit, an input/output interface 204 and support circuitry 206. In certain embodiments, where the computer system 200 requires a direct human interface, a display 208 and an input device 210 such as a keyboard, mouse or pointer are also provided. The display 208, input device 210, processor 202, and support circuitry 206 are shown connected to a bus 212 which also connects to a memory 214. Memory 214 includes program storage memory 216 and data storage memory 218. Note that while computer 200 is depicted with direct human interface components display 208 and input device 210, programming of modules and exportation of data can alternatively be accomplished over the interface 204, for instance, where the computer 200 is connected to a network and the programming and display operations occur on another associated computer, or via a detachable input device as is known with respect to interfacing programmable logic controllers.

Program storage memory 216 and data storage memory 218 can each comprise volatile (RAM) and non-volatile (ROM) memory units and can also comprise hard disk and backup storage capacity, and both program storage memory 216 and data storage memory 218 can be embodied in a single memory device or separated in plural memory devices. Program storage memory 216 stores software program modules and associated data, and in particular stores one or more of the data historian module 220, computation module 230 and display module 240, or a combination including at least one of the foregoing modules. Data storage memory 218 stores tags and other data generated by the one or more modules of the present invention and event data received by the flare-through elements.

The computing device 200 preferably supports an operating system, for example stored in program storage memory 216 and executed by the processor 202 from volatile memory. It is to be appreciated that the computer system 200 can be any computer such as a personal computer, minicomputer, workstation, mainframe, a dedicated controller such as a programmable logic controller, or a combination thereof. While the computer system 200 is shown, for illustration purposes, as a single computer unit, the system can comprise a group/farm of computers which can be scaled depending on the processing load and database size.

In addition, as described above, the functionality of the computer system 200 can be executed by one or more of the servers shown, for instance, in FIG. 1, and/or within a DCS of a particular plant.

The method and system of the present invention have been described above and in the attached drawings; however, modifications will be apparent to those of ordinary skill in the art and the scope of protection for the invention is to be defined by the claims that follow.

We claim:

1. A flare monitoring system to ascertain quantitative data concerning flare events within a commercial or industrial processing facility, the flare monitoring system comprising:
   a network of flare-through elements in controlled or passive fluid communication with one or more upstream fluid sources and each generating a data signal;
   a processor coupled to a memory;
   the fluid sources being flare fluid contributors for which the quantity of flare fluid at each source is estimated by a plurality of processing modules associated with the processor and the memory including:
      a data historian module operable to:
         store into memory parameters of the flare-through elements concerning the relationship between generated data signals and quantitative fluid flow values;
         store into memory data concerning the fluid sources upstream of the flare-through elements;
         receive (and store) real-time data signals generated by the plurality of flare-through elements; and
      a computation module that computes estimated flare fluid contributor quantities from each flare-through element associated with a fluid source as a function of received data signals associated with each flare-through element, parameters of the flare-through element and information concerning the fluid source.

2. The flare monitoring system as in claim 1, wherein the data historian module is operable to store into memory data as to whether data signals generated by a flare-through element are routine or non-routine.

3. The flare monitoring system as in claim 2, wherein the visual schematic display further includes a representation of the data signal associated with each flare-through element.

4. The flare monitoring system as in claim 3, wherein the visual schematic display further includes an indicator at each flare-through element as to whether the flare event is routine or non-routine.

5. The flare monitoring system as in claim 1, further comprising a display module that provides a visual schematic display of at least a portion of the network of flare-through elements and their respective fluid sources.

6. The flare monitoring system as in claim 5, wherein the visual schematic display further includes estimated flare fluid contributor quantities at each source.

7. The flare monitoring system as in claim 6, wherein the visual schematic display further includes an indicator at each flare-through element as to whether the flare event is routine or non-routine.

8. The flare monitoring system as in claim 5, wherein the visual schematic display further includes an indicator at each flare-through element as to whether the flare event is routine or non-routine.

9. The flare monitoring system as in claim 5, wherein the visual schematic display further includes a representation of the data signal associated with each flare-through element.

10. The flare monitoring system as in claim 1, wherein the flare-through elements include control valves each being in controlled fluid communication with one or more upstream fluid sources and each generating the data signal,
    wherein the data historian module is operable to store into memory parameters of the control valves concerning the relationship between generated data signals and quantitative fluid flow values, store into memory data concerning the fluid sources upstream of the control valves, and receive (and store) real-time condition data signals generated by the plurality of control valves; and
    wherein the computation module is operable to compute estimated flare fluid contributor quantities from each control valve associated with a fluid source as a function of received data signals associated with each valve, parameters of the control valve and information concerning the fluid source.

11. The flare monitoring system as in claim 10, wherein the data historian module generates tables containing, for each control valve, data concerning the relationship between data signals and quantitative fluid flow values and data concerning the associated fluid source(s).

12. The flare monitoring system as in claim 11, wherein data concerning the relationship between data signals and quantitative fluid flow values include flow coefficient (Cv) data for the control valve.

13. The flare monitoring system as in claim 1, wherein the network of flare-through elements includes plural plants within one refinery.

14. The flare monitoring system as in claim 1, wherein the network of flare-through elements includes plural plants within plural refineries.

* * * * *